United States Patent
Xhafa et al.

(10) Patent No.: US 11,812,268 B2
(45) Date of Patent: Nov. 7, 2023

(54) DATA INTEGRITY OPTIONS FOR WIRELESS MANAGEMENT OF MODULAR SUBSYSTEMS

(71) Applicant: Texas Instruments Incorporated, Dallas, TX (US)

(72) Inventors: Ariton E. Xhafa, Plano, TX (US); Vishal Coelho, Flower Mound, TX (US); Alexis Justine Burnight, Dallas, TX (US); Ramanuja Vedantham, Frisco, TX (US); Karl-Heinz Steinmetz, Durmersheim (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/491,218

(22) Filed: Sep. 30, 2021

(65) Prior Publication Data
US 2023/0099921 A1  Mar. 30, 2023

(51) Int. Cl.
*H04W 12/104* (2021.01)
*H04W 12/106* (2021.01)

(52) U.S. Cl.
CPC ................. *H04W 12/106* (2021.01)

(58) Field of Classification Search
CPC . H04L 2209/80; H04L 9/3242; H04L 63/123; H04L 63/0428; H04L 9/0822; H04L 9/14; H04W 12/06; H04W 12/041; H04W 12/106; H04W 12/10; H04W 12/08; H04W 84/18
See application file for complete search history.

(56) References Cited

U.S. PATENT DOCUMENTS

| | | | |
|---|---|---|---|
| 9,293,935 | B2 | 3/2016 | Lee |
| 10,703,211 | B2 | 7/2020 | Chuang |
| 11,038,216 | B2 | 6/2021 | Kwon |
| 11,483,824 | B2 | 10/2022 | Lee |
| 2008/0159355 | A1 | 7/2008 | Rengert |
| 2011/0150042 | A1 | 6/2011 | Liu |
| 2016/0218866 | A1* | 7/2016 | Patil .................... H04W 12/041 |

(Continued)

OTHER PUBLICATIONS

EM Microelectronic, EM9301 Datasheet, 2018, 51 pages (Year: 2018).*
Song et al. "The AES-CMAC Algorithm", National Institute of Standards and Technology (NIST), 2006, "https://www.rfc-editor.org/rfc/pdfrfc/rfc4493.txt.pdf", 20 pages (Year: 2006).*

(Continued)

*Primary Examiner* — Quoc Thai N Vu
(74) *Attorney, Agent, or Firm* — Carl G. Peterson; Frank D. Cimino

(57) ABSTRACT

A communication circuit for communications between a controller and a subsystem with a monitored electrical component is described. The communication circuit includes network formation circuitry configured to establish a wireless network between a primary wireless node adapted to be coupled to the controller and a secondary wireless node coupled to the subsystem. The communication circuit also includes data transfer circuitry configured to perform data transfers between the primary wireless node and the secondary wireless node. The communication circuit further includes data integrity circuitry configured to: generate a hash for data received by the communication circuit; and verify the hash before the data transfer circuitry performs a data transfer of the data between the primary wireless node and the secondary wireless node.

24 Claims, 7 Drawing Sheets

(56) References Cited

U.S. PATENT DOCUMENTS

| | | |
|---|---|---|
| 2019/0237816 A1 | 8/2019 | Kim |
| 2019/0265304 A1 | 8/2019 | Kim |
| 2019/0273293 A1* | 9/2019 | Kim .................... H01M 10/48 |
| 2019/0363815 A1 | 11/2019 | Bogenberger |
| 2020/0396688 A1 | 12/2020 | Hong |
| 2021/0043983 A1 | 2/2021 | Choi |
| 2021/0084675 A1 | 3/2021 | Aijaz |
| 2021/0281988 A1 | 9/2021 | Han |
| 2021/0319877 A1 | 10/2021 | Teng |
| 2021/0377894 A1 | 12/2021 | Kamath |
| 2022/0091062 A1 | 3/2022 | Gullapalli |
| 2022/0113356 A1 | 4/2022 | Kasselman |
| 2022/0179001 A1 | 6/2022 | Park |
| 2022/0332213 A1 | 10/2022 | Xhafa |
| 2022/0368364 A1 | 11/2022 | Martinez |
| 2022/0417792 A1 | 12/2022 | Winder |

OTHER PUBLICATIONS

Nordic semiconductor, nRF25840 Datasheet, 2018, 551 pages (Year: 2018).*

Texas Instruments. CC2642R SimpleLink(TM) Bluetooth(R) 5.2 Low Energy Wireless MCU. SWRS194H—Jan. 2018—Revised Mar. 2021. 66 pages.

International Standard, ISO 26262-1, "Road vehicles—Functional Safety", International Organization for Standardization, Second Addition, Dec. 2018, 42 pgs.

Xhafa, et al., "Wireless Protocol for Battery Management Systems", Texas Instruments, Jun. 4, 2019, 6 pgs.

Xhafa, et al., U.S. Appl. No. 17/820,441, "Mesh Network During Keep Alive in Wireless Battery Management System", filed Aug. 17, 2022.

Kunduru, et al., U.S. Appl. No. 17/823,138, "Multiple Primary Nodes for Wireless Battery Management System Robustness", filed Aug. 30, 2022.

* cited by examiner

new electronic devices are developed and integrated circuit (IC) technology advances, new IC products are commercialized. One example IC product for electronic devices is a communication circuit with a wireless transceiver. There are many different wireless communication protocols and related wireless transceivers to support different ranges of wireless data transfer, different levels of security, frequencies used, and/or other variations. In some systems, wireless transceivers may be added to simplify wiring and facilitate replacement or repair of components/modules of a system. However, the addition of wireless transceivers may lower the overall data integrity of a system relative to a data integrity target due to the wireless transceivers adding a new source of data vulnerability. While use of short-range wireless transceivers can help reduce exposure to data vulnerability, some systems may need to prioritize data integrity to an even higher standard to ensure safety or another system criteria.

One example system that could benefit from wireless transceivers is an electric vehicle with a battery management system. In this example, the addition of wireless transceivers would simplify the wiring of battery management system components (e.g., battery monitoring modules) to be more easily serviced or swapped out as needed. However, the addition of wireless transceivers comes at the cost of increased exposure to data vulnerability, which may be an unacceptable safety risk for the electric vehicle.

DATA INTEGRITY OPTIONS FOR WIRELESS MANAGEMENT OF MODULAR SUBSYSTEMS

BACKGROUND

SUMMARY

In at least one example, a communication circuit for communications between a controller and a subsystem with a monitored electrical component is described. The communication circuit comprises network formation circuitry configured to establish a wireless network between a primary wireless node in communication with the controller and a secondary wireless node in communication with the subsystem. The communication circuit also comprises: data transfer circuitry configured to perform data transfers between the primary wireless node and the secondary wireless node; and data integrity circuitry. The data integrity circuitry is configured to: generate a hash for data received by the communication circuit; and verify the hash before the data transfer circuitry performs a data transfer of the data between the primary wireless node and the secondary wireless node.

In another example, a system comprises a communication circuit having: a wired transceiver adapted to be coupled to a controller or modular subsystem; and a wireless transceiver adapted to be coupled to an antenna. The communication circuit is configured to: generate a hash for data received via the wired transceiver; and verify the hash before the wireless transceiver conveys related data to the antenna.

In yet another example, a method is performed by a communication circuit between a controller and a subsystem. The method comprises: receiving data via a wired transceiver of the communication circuit; generating a hash based on the received data; and verifying the hash before a wireless transceiver of the communication circuit conveys related data to an antenna.

BRIEF DESCRIPTION OF THE DRAWINGS

The same reference number is used in the drawings for the same or similar (either by function and/or structure) features.

DETAILED DESCRIPTION

Figure 1:
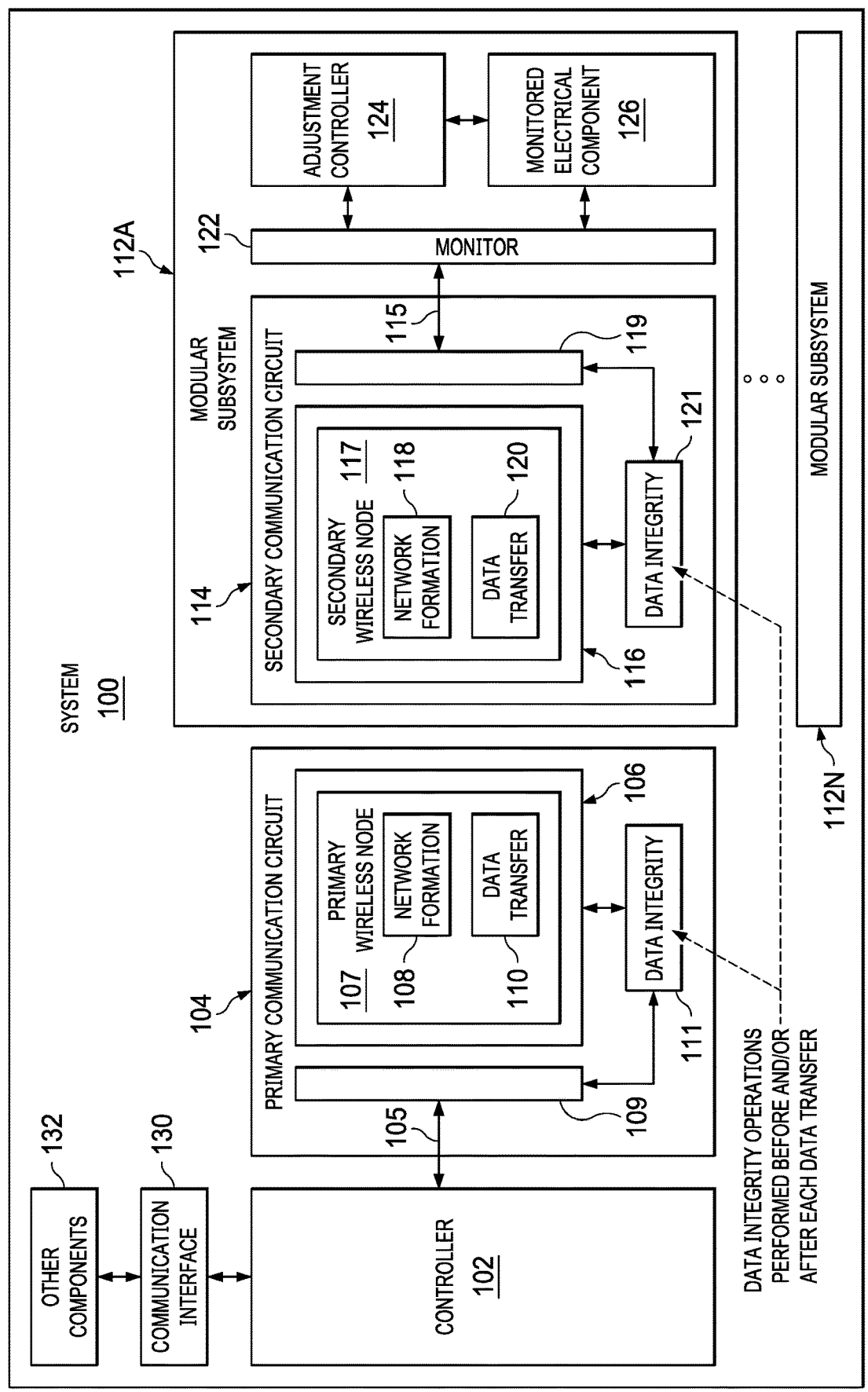
FIG. 1 is a block diagram of a system in accordance with an example embodiment.

Some example embodiments include a communication circuit with a wired transceiver, a wireless transceiver, and data integrity circuitry. The communication circuit may be an integrated circuit (IC) or other circuit. The data integrity circuitry is configured to: generate a hash for data received by the communication circuit; and verify the hash before the data is transferred from the communication circuit.

In some example embodiments, a system includes multiple communication circuits, where one of the communication circuits is associated with a primary wireless node, and the others of the communication circuits are each associated with respective secondary wireless nodes. In one example embodiment, the system is an electric vehicle and the communications circuits are part of a wireless subsystem management system such as a wireless battery management system (WBMS). For a WBMS, the primary wireless node is part of a primary communication circuit included with a battery management unit (BMU) of the WBMS. The BMU includes, for example, a printed circuit board (PCB) with a controller and the primary communication circuit coupled via a wired coupling. In other words, a wired transceiver of the primary communication circuit is coupled to the controller. The wired transceiver of the primary communication circuit is configured to receive data from and provide data to the controller.

In some example embodiments, data received from the controller may be hashed by the primary communication circuit and/or other data integrity options are performed. For example, the hash may be stored and verified before a wireless transceiver of the primary communication circuit transfers the related data to an antenna for wireless transfer to one or more secondary communication circuits with respective wireless transceivers and secondary wireless nodes. In some example embodiments, packets transferred by the primary communication circuit include packet data and a related hash. The related hash may be verified by each secondary communication circuit that receives the packet before the data is transferred to a respective monitor circuit. More specifically, each secondary communication circuit of the system includes a respective wired transceiver coupled to a respective monitor circuit.

In some example embodiments, each secondary communication circuit and each monitor circuit is part of a respective cell monitor unit (CMU) of a WBMS. Each CMU includes, for example, a PCB with a respective secondary communication circuit, a respective monitor circuit, and/or other components (e.g., an adjustment controller for a monitored electrical component). Each CMU is configured to monitor a monitored electronic component (e.g., a rechargeable battery in the example of a WBMS). More specifically, the wired transceiver of each secondary communication circuit is coupled to a respective monitor circuit. The wired transceiver of each secondary communication circuit is configured to receive data from and provide data to a respective monitor circuit. In some example embodiments, data received from a monitor circuit may be hashed by a respective secondary communication circuit and/or other data integrity operations are performed. For example, the hash may be stored and is verified before a wireless transceiver of the secondary communication circuit transfers the related data to an antenna for wireless transfer to the primary communication circuit and/or other secondary communication circuits with respective wireless transceivers.

In some example embodiments, packets transferred by each secondary communication circuit include packet data and a related hash, which may be verified by the primary communication circuit before the data is transferred to the controller via the wired transceiver of the primary communication circuit. As another option, a hash included with a packet transferred from a secondary communication circuit may be verified by another secondary communication circuit before the data is transferred to a respective monitor circuit via the wired transceiver of the other secondary communication circuit that receives the packet. With the data integrity options described herein, the addition of wireless connectivity to a system for subsystem management provides the benefits of facilitating wiring, repair, or replacement of subsystems or related components without compromising the data integrity of the system (e.g., ensuring subsystem management complies with data integrity, target safety goals, and/or other design criteria).

FIG. 1 is a block diagram of a system 100 in accordance with an example embodiment. In some example embodiments, the system 100 is an electric vehicle with battery management subsystems, or another system with modular subsystems. The system 100 includes a controller 102 in communication with modular subsystems 112A-112N via wireless communication channels (not shown). To support such communications between the controller 102 and the modular subsystems 112A-112N, the controller 102 is coupled via a wired coupling 105 to a primary communication circuit 104. The controller 102 is also coupled to other components 132 of the system 100 via a communication interface 130. In some example embodiments, the communication interface 130 is a controller area network (CAN) or other communication interface.

In the example of FIG. 1, each of the modular subsystems 112A-112N includes a respective secondary communication circuit 114 in communication with the primary communication circuit 104 via respective wireless communication channels. As shown for the modular subsystem 112A, the secondary communication circuit 114 is coupled to a respective monitor circuit 122 via a wired coupling 115. Thus, the controller 102 is able to communicate with each respective monitor circuit 122 of the modular subsystems 112A-112N and vice versa via a combination of wired and wireless communications. Such communications may be for battery management system (BMS) operations or management of another type of monitored electrical component 126.

Adding wireless communications to the system 100 using the primary communication circuit 104 and each secondary communication circuit 114 facilitates wiring, repair and/or replacement of some or all of the components of the modular subsystems 112A-112N. However, such wireless communications may introduce data integrity vulnerabilities to the system 100. Accordingly, in the example of FIG. 1, the primary communication circuit 104 includes data integrity circuitry 111 configured to perform data hashing, hash verification, and/or other operations to improve the integrity of data transferred via the primary communication circuit 104. Likewise, each secondary communication circuit 114 includes data integrity circuitry 121 configured to perform data hashing, hash verification, and/or other operations to improve the integrity of data transferred via each secondary communication circuit 114. With the data integrity circuitry 111 and 121, wireless communications for the system 100 are supported, while maintaining a target level of data integrity.

In some example embodiments, data encryption is another possibility (besides hashing and hash verification) for improving data integrity. As another option, data encryption is omitted to reduce complexity and/or communication latency. Another option is to combine data hashing and hash verification with data encryption. In some example embodiments, data hashing and hash verification may be used before data is encrypted and after data is decrypted.

In operation, each of the modular subsystems 112A-112N uses its respective monitor circuit 122 to monitor parameters of a monitored electrical component 126. In some example embodiments, the monitored electrical component 126 is a rechargeable battery. Without limitation, the monitored parameters may include a voltage across the monitored electrical component 126 and/or a current through the monitored electrical component 126. The monitored parameters are transferred to the controller 102, which analyses the monitored parameters and determines whether any adjustments are needed. If adjustments are needed for a given modular subsystem, the controller 102 provides adjustment control signals to the given modular subsystem. Each of the modular subsystems 112A-112N includes a respective adjustment controller 124, which is configured to adjust operations of a respective monitored electrical component 126 based on any adjustment control signals received from the controller 102.

In some example embodiments, the primary communication circuit 104 is an IC with a wired transceiver 109 and a wireless transceiver 106. The wired transceiver 109 is coupled to the controller 102 and is configured to send data to and receive data from the controller 102 via the wired coupling 105. The wired transceiver 109 is also configured to send data to or receive data from the wireless transceiver 106. In addition, the wireless transceiver 106 is configured to send data to or receive data from other wireless transceivers (e.g., the wireless transceiver 116 of each secondary communication circuit 114 for each respective modular subsystem 112A-112N).

In the example of FIG. 1, the wireless transceiver 106 includes a primary wireless node 107, which includes circuitry and related programming/instructions to support a wireless network stack. As shown, the primary wireless node 107 includes network formation circuitry 108 configured to establish a wireless network between the primary wireless node 107 in communication with the controller 102 and a secondary wireless node 117 in communication with or part of a given modular subsystem. The primary wireless node 106 also includes data transfer circuitry 110 configured to perform data transfers between the primary wireless node 107 and each secondary wireless node 117. As shown, the primary communication circuit 104 further includes data integrity circuitry 111. In the example of FIG. 1, the data integrity circuitry 111 is shown separate from the wireless transceiver 106 because at least some of its operations may be performed before and/or after the wireless transceiver 106 receives data (e.g., from the controller 102). The data integrity circuitry 111 is configured to: generate a hash for data received by the primary communication circuit 104; and verify the hash before the data transfer circuitry 110 performs a data transfer of the data between the primary wireless node 107 and the secondary wireless node 117.

In some example embodiments, the data integrity circuitry 111 performs additional operations to provide data integrity. In some example embodiments, the data integrity circuitry 111 provides a verified hash and related data to the data transfer circuitry 110. In such example embodiments, the data transfer circuitry 110 may prepare a packet that includes the verified hash and related data. The packet is transferred wirelessly from the primary communication circuit 104 to one or more secondary communication circuits 114. In some example embodiments, the data transfer circuitry 110 may receive a packet that includes packet data and a related hash determined by the data integrity circuitry 121 of a given secondary communication circuit 114. In such case, the data integrity circuitry 111 may verify the hash include with the packet before the packet data is forwarded to the controller 102 via the wired transceiver 109.

As shown, the secondary communication circuit 114 includes a wireless transceiver 116 with the secondary wireless node 117. The secondary wireless node 117 includes circuitry and related programming/instructions to support a wireless network stack. As shown, the secondary wireless node 117 includes network formation circuitry 118 configured to establish a wireless network between the secondary wireless node 117 in communication with a given monitor circuit 122 and the primary wireless node 107 in communication with the controller 102. As another option, the secondary wireless node 117 of different modular subsystems may communicate wirelessly with each other. The secondary wireless node 117 also includes data transfer circuitry 120 configured to perform data transfers between the secondary wireless node 117 and the primary wireless node 107. As another option, data transfers occur between the secondary wireless nodes of different modular subsystems.

As shown, the secondary communication circuit 114 also includes the data integrity circuitry 121. In the example of FIG. 1, the data integrity circuitry 121 is shown separate from the wireless transceiver 116 because at least some of its operations may be performed before and/or after the wireless transceiver 116 receives data (e.g., from the monitor circuit 122). In some example embodiments, the data integrity circuitry 121 is configured to: generate a hash for data received by the secondary communication circuit 114; and verify the hash before the data transfer circuitry 120 performs a data transfer of the data between the secondary wireless node 117 and the primary wireless node 107. As another option, data integrity operations are performed before and/or after data transfers between the secondary wireless nodes of different modular subsystems.

In some example embodiments, the data integrity circuitry 121 performs additional operations to provide data integrity. In some example embodiments, the data integrity circuitry 121 provides a verified hash and related data to the data transfer circuitry 120. The data transfer circuitry 120 prepares a packet that includes the verified hash and related data. The packet is transferred wirelessly from the secondary communication circuit 114 to the primary communication circuit 104. As another option, the data transfer circuitry 120 may receive a packet that includes packet data and a related hash determined by the data integrity circuitry 111 of the primary communication circuit 104. In such case, the data integrity circuitry 121 may verify the related hash before the packet data is forwarded to the monitor circuit 114 by the wired transceiver 119. As another option, such data integrity operations may be performed before and/or after data transfers between the secondary wireless nodes of different modular subsystems. In FIG. 1, each of the modular subsystems 112A-112N may include similar components and functionality as the modular subsystem 112A.

In some example embodiments, a communication circuit (e.g., the primary communication circuit 104 or the secondary communication circuit 114) for communications between a controller (e.g., the controller 102) and a subsystem (e.g., one of the modular subsystems 112A-112N) with a monitored electrical component (e.g., the monitored electrical component 126) is described. The communication circuit includes: network formation circuitry (e.g., the network formation circuitry 108 or 118) configured to establish a wireless network between a primary wireless node (e.g., the primary wireless node 107) in communication with the controller and a secondary wireless node (e.g., the secondary wireless node 117) in communication with the subsystem. The communication circuit also includes data transfer circuitry (e.g., the data transfer circuitry 110 or the data transfer circuitry 120) configured to perform data transfers between the primary wireless node and the secondary wireless node. The communication further includes data integrity circuitry (e.g., the data integrity circuitry 111 or the data integrity circuitry 121) configured to: generate a hash for data received by the communication circuit; and verify the hash before the data transfer circuitry performs a data transfer of the data between the primary wireless node and the secondary wireless node. In some example embodiments, the data integrity circuitry is configured to verify the hash by: storing the hash for the data received by the communication circuit; generating a new hash before the data transfer circuitry performs a data transfer of the data; and comparing the new hash with the stored hash.

In some example embodiments, the network formation circuitry and the data transfer circuitry are part of a wireless transceiver (e.g., the wireless transceiver 106 or the wireless transceiver 116 in FIG. 1) adapted to be coupled to an antenna. Further, the communication circuit may comprise a wired transceiver (e.g., the wired transceiver 109 or the wired transceiver 119 in FIG. 1) adapted to be coupled to the subsystem or the controller. In such embodiments, the data integrity circuitry is configured to: generate a hash for data received by the wired transceiver; and verify the hash before the wireless transceiver performs a data transfer of the data between the primary wireless node and the secondary wireless node. In some example embodiments, the wireless transceiver includes a radio-frequency (RF) module. Meanwhile, the wired transceiver includes a Universal Asynchronous Receiver-Transmitter (UART).

In some example embodiments, the data integrity circuitry is configured to generate a compare pass signal responsive to the new hash and the hash being equal. In response to the compare pass signal, the data transfer circuitry (e.g., the data transfer circuitry 110 or the data transfer circuitry 120) is configured to perform a data transfer of the data related to the hash and the new hash. In some example embodiments, the data integrity circuitry is configured to generate a compare fail signal responsive to the new hash and the hash not being equal. In response to the compare fail signal, the data transfer circuitry is configured to prevent data transfer of data related to the hash and the new hash.

In some example embodiments, the data transfer circuitry is configured to: prepare a packet that includes the data and the hash; and use the wireless transceiver to transfer the packet between the primary wireless node and the secondary wireless node. In some example embodiments, the wireless transceiver is configured to receive a packet that includes packet data and a related hash. In response to receiving such a packet, the data integrity circuitry is configured to: store the related hash; generate a new hash based on the packet data; compare the related hash and the new hash; and forward the packet data to the wired transceiver if the related hash and the new hash match.

Figure 2:
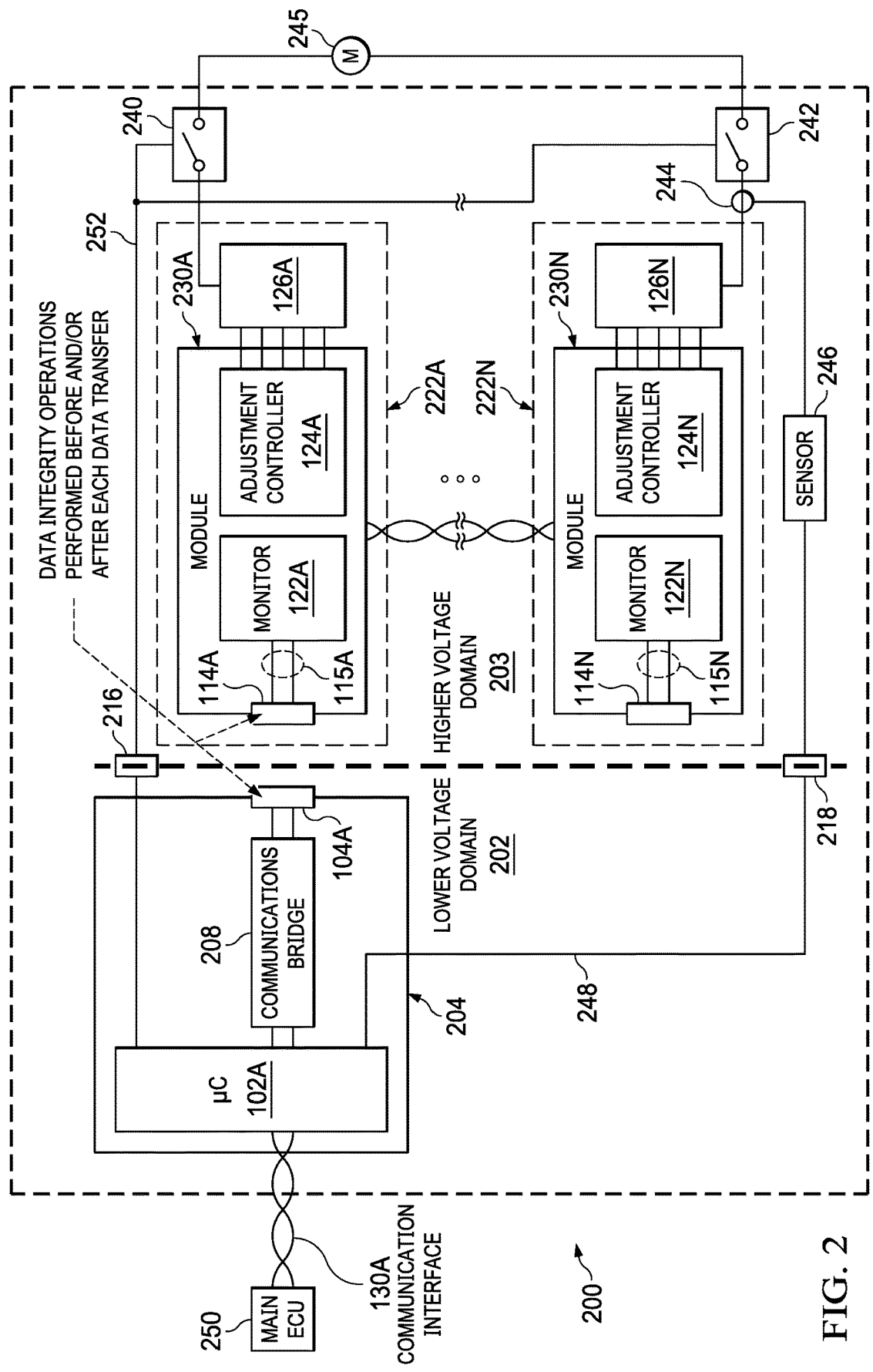
FIG. 2 is a block diagram of another system in accordance with another example embodiment.

FIG. 2 is a block diagram of another system 200 in accordance with an example embodiment. With the system 200, wireless management of modular subsystems 222A-222N (examples of the modular subsystems 112A-112N in FIG. 1) is provided with data integrity features. In FIG. 2, the system 200 includes a lower voltage domain 202 (e.g., 12, 24, or 48 volts) with control circuitry 204. Meanwhile, the modular subsystems 222A-222N are in a higher voltage domain 203 (e.g., several hundreds of volts) compared to the control circuitry 204. As shown, the control circuitry 204 includes a microcontroller 102A (an example of the controller 102 in FIG. 1) and a primary communication circuit 104A (an example of the primary communication circuit 104 in FIG. 1). The control circuitry 204 may also include a communications bridge 208 between the microcontroller 102A and the primary communication circuit 104A. In the example of FIG. 2, a main electronic control unit (ECU) 250 for the system 200 is coupled to the control circuitry 204 via a communication interface 130A (an example of the communication interface 130 in FIG. 1). In operation, the primary communication circuit 104A is configured to perform wired transceiver operations, wireless transceiver operations, and data integrity operations as described herein.

As shown, the modular subsystem 222A includes a module 230A. The module 230A may include a PCB with a secondary communication circuit 114A (an example of the secondary communication circuit 114 in FIG. 1), a monitor circuit 122A (an example of the monitor circuit 122 in FIG. 1), and an adjustment controller 124A (an example of the adjustment controller 124 in FIG. 1). The module 230A is coupled to a monitored electrical component 126A (an example of the monitored electrical component 126 in FIG. 1). In the example of FIG. 2, each of the modular subsystems 222A-222N includes a respective module 230A-230N coupled to a respective monitored electrical component 126A-126N. In some example embodiments, the monitored electrical components 126A-126N are rechargeable batteries or other components with a variable status. Without limitation, each the modules 230B-230N include the same type of components (e.g., a secondary communication circuit, a monitor circuit, and an adjustment controller) as the module 230A.

In FIG. 2, the secondary communication circuit 114A is configured to perform wired transceiver operations, wireless transceiver operations, and data integrity operations as described herein. Also, the monitored electronic components 126A-126N may be coupled together to provide a combined function. As shown, the system 200 includes switches 240, 242, and component 245. In some example embodiments, the component 245 is a motor/engine. In this case, closing the circuit at switches 240 and 242 results in current flowing through the engine/motor to operate a vehicle. When the vehicle is parked or turned off, the switches 240 and 242 are open. In the example of FIG. 2, the switches 240 and 242 are controlled by a control signal 252 from the microcontroller 102A. The control signal 252 is conveyed to the switches 240 and 242, for example, via interface 216. In the example of FIG. 2, the microcontroller 102A may also receive a current sense signal 248 via interface 218, where the current sense signal 248 is generated from a loop 244 or related sensor 546.

In operation, the primary communication circuit 104A is configured to send data to and receive data from the microcontroller 102A via a wired coupling (e.g., the communications bridge 208). The primary communication circuit 104A is also configured to send data to and receive data from one or more of the secondary communication circuits 114A-114N via respective wireless communication channels (not shown). In some example embodiments, data integrity operations (e.g., data hashing and hash verification) are performed before data from the microcontroller 102A is transferred from the primary communication circuit 104A to one or more of the secondary communication circuits 114A-114N. In addition, data integrity operations (e.g., data hashing and hash verification) may be performed by the primary communication circuit 104A before data from one or more of the secondary communication circuits 114A-114N is transferred from the primary communication circuit 104A to the microcontroller 102A.

In the example of FIG. 2, each of the secondary communication circuit 114A-114N is configured to send data to and receive data from a respective monitor circuit 122A-122N via a respective wired couplings 115A-115N (examples of the wired coupling 115 in FIG. 1). Each of the secondary communication circuits 114A-114N is additionally or alternatively configured to send data to and receive data from the primary communication circuit 104A and/or another of the secondary communication circuits 114A-114N via wireless communication channels (not shown). In some example embodiments, data integrity operations (e.g., data hashing and hash verification) are performed before data from a respective monitor circuit is transferred from a given secondary communication circuit to: the primary communication circuit 104A; and/or another of the secondary communication circuits 114A-114N. Additionally or alternatively, data integrity operations may be performed by a given secondary communication circuit before data from the primary communication circuit 104A and/or another of the secondary communication circuits 114A-114N is transferred from the given secondary communication circuit to a respective monitor circuit.

Figure 3:
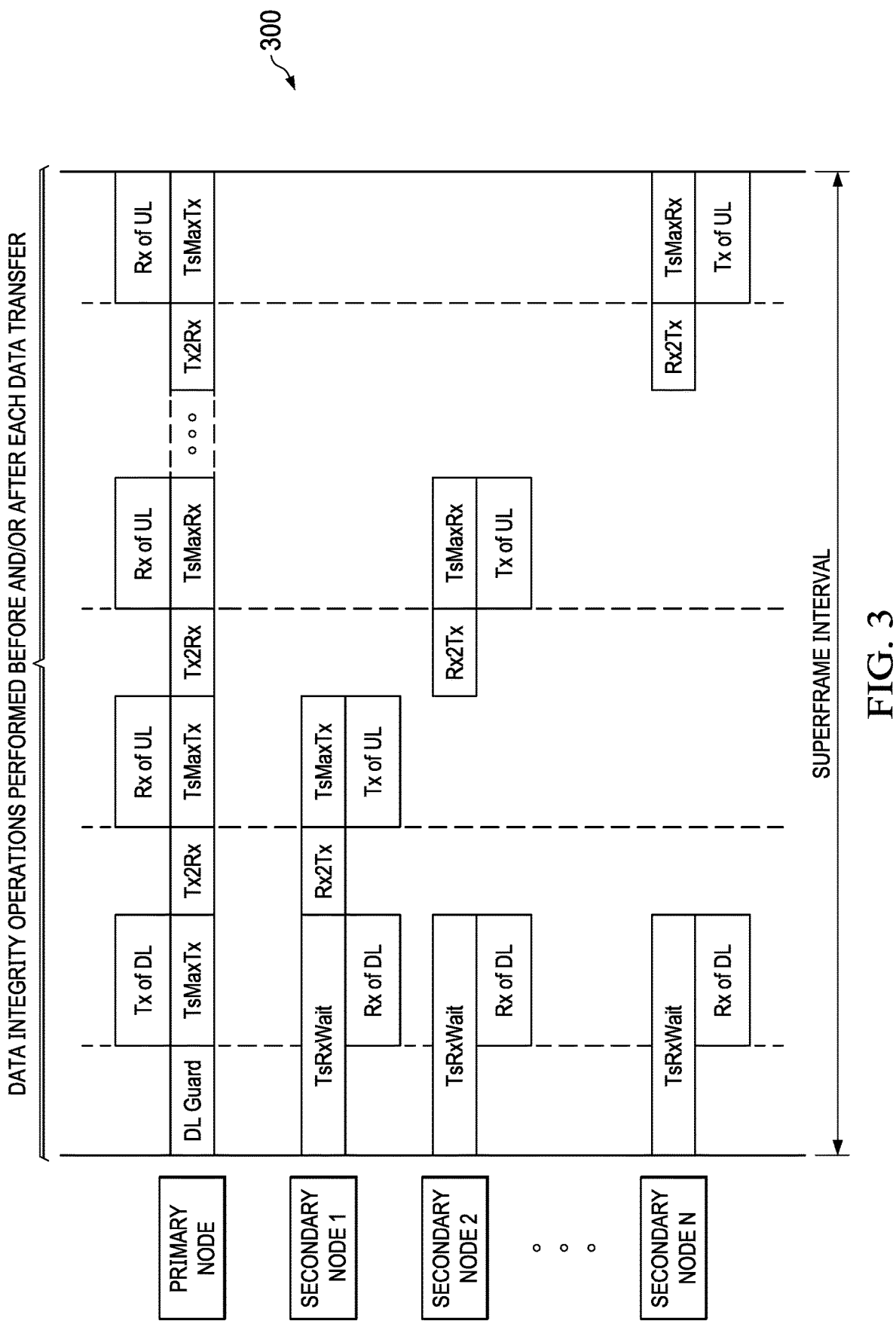
FIG. 3 is a diagram of a wireless management network protocol in accordance with an example embodiment.

FIG. 3 is a diagram of a wireless management network protocol 300 in accordance with an example embodiment. The protocol 300 supports data transfers between a primary wireless node (e.g., the primary wireless node 107 in FIG. 1) and secondary wireless nodes (each secondary wireless node 117 in FIG. 1) in a system (e.g., the system 100 in FIG. 1, or the system 200 in FIG. 2) with managed subsystems.

In FIG. 3, time is divided into slots and the primary wireless node transmits packets in the downlink (DL) slot, while the secondary wireless nodes transmit their packets in respective uplink (UL) slots. The time interval that includes a single DL slot (for the primary wireless node to transmit)

and all UL slots (for each secondary wireless nodes to transmit packets) is called a Superframe interval. In the wireless management network protocol 300, one Superframe is represented. Over time, the wireless management network protocol 300 may use a plurality of such Superframes (one Superframe after another Superframe, etc.) to support data transfers between: 1) a primary wireless node and a secondary wireless node; or 2) a secondary wireless node and another secondary communication circuit. While FIG. 3 shows data communication involving multiple secondary wireless nodes, there are scenarios (e.g., in a scanning/joining phase) when only the primary wireless node and a single secondary wireless node exchange information (e.g., for the secondary wireless node to join a network).

In the wireless management network protocol 300, data integrity operations are performed before and/or after each data transfer between: 1) a primary wireless node and a secondary wireless node; or 2) a secondary wireless node and another secondary communication node. Example data integrity operations include: data hashing; hash verification; preparing packets with data and a related hash; and/or verifying the related hash in a packet before forwarding the packet data to a controller or monitor circuit.

Figure 4:
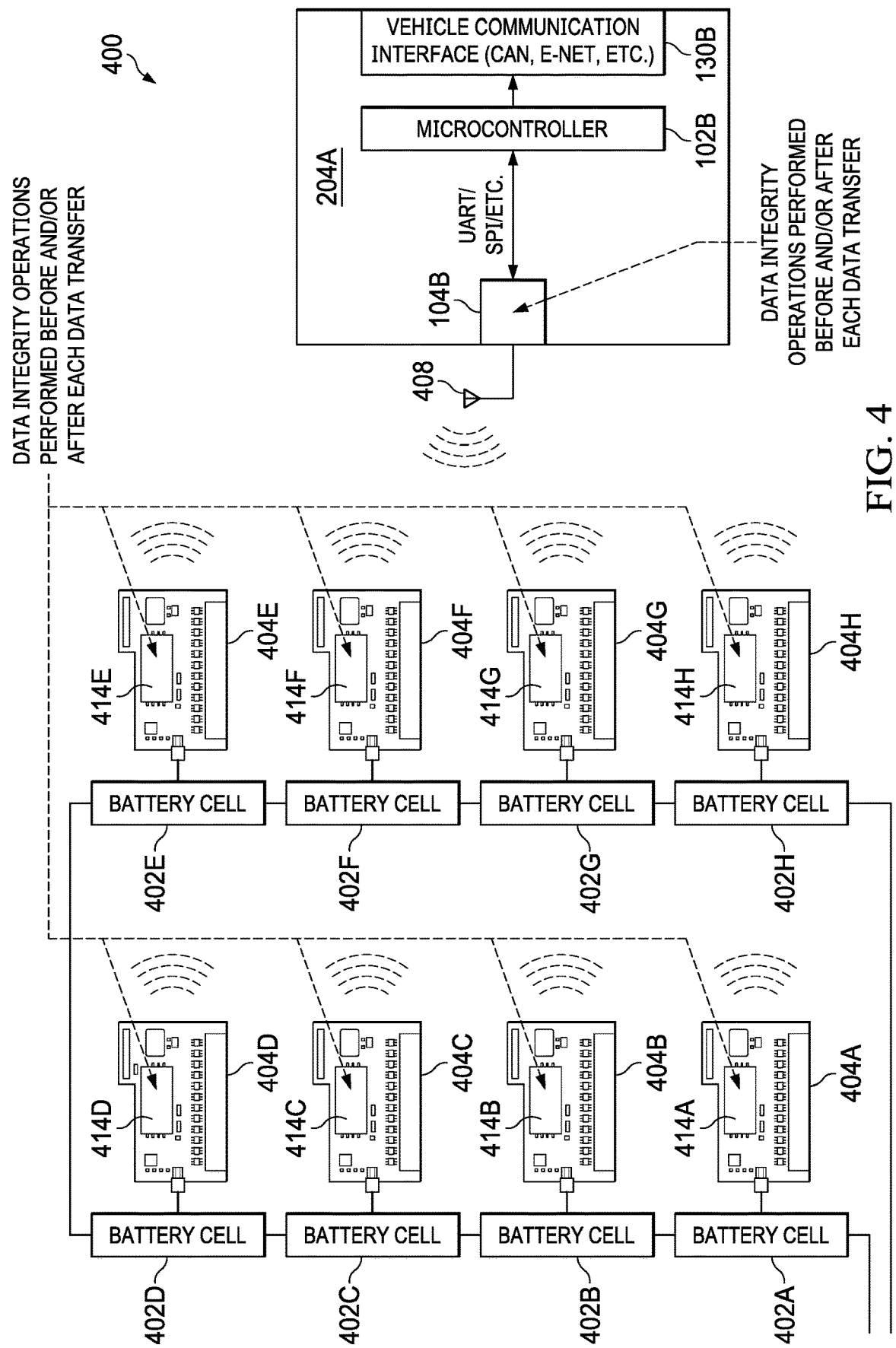
FIG. 4 is a diagram of a Wireless Battery Management System (WBMS) in accordance with an example embodiment.

FIG. 4 is a diagram of a WBMS 400 in accordance with an example embodiment. As shown, the WBMS 400 includes battery cells 402A-402H (e.g., Li-ion cells) in series. Each of the battery cells 402A-402H is coupled to a respective module 404A-404H (examples of the modules 230A-230N in FIG. 2) to form respective modular subsystems (e.g., the battery cell 402A and the module 404A is an example of a modular subsystem as described herein). Each of the modules 404A-404H may perform monitoring, adjustment, wired transceiver operations, wireless transceiver operations, and/or data integrity operations as described herein.

In the example of FIG. 4, the WBMS 400 includes control circuitry 204A (an example of the control circuitry 204 in FIG. 2) with a microcontroller 102B (an example of the controller 102 in FIG. 1, or the microcontroller 102A in FIG. 2), a primary communication circuit 104B (an example of the primary communication circuit 104 in FIG. 1, or the primary communication circuit 104A in FIG. 2), and a communication interface 130B (an example of the communication interface 130 in FIG. 1, or the communication interface 130A in FIG. 2). In the example of FIG. 4, the microcontroller 102B and the primary communication circuit 104B communicate via a wired transceiver protocol such as a Universal Asynchronous Receiver-Transmitter (UART) protocol, a serial peripheral interface (SPI) protocol, or other wired transceiver protocol. Also, the communication interface 130B may be a vehicle communication interface such as a controller area network (CAN) interface, an Ethernet interface, or other communication interface. As shown, the control circuitry 204A is coupled to an antenna 408 for wireless communications with the modules 404A-404H. In operation, the primary communication circuit 104B is configured to perform wired transceiver options, wireless transceiver options, and data integrity operations as described herein.

With the WBMS 400, the functionality of the battery cells 402A-402H is combined and the combined functionality of all of the battery cells 402A-402H is monitored and adjusted as needed. For example, the performance of the battery cells 402A-402H may degrade over time. In such case, adjustment or replacement of a specific one of the battery cells 402A-402H or components of the modules 404A-404H may be needed. By using the primary communication circuit 104B and the secondary communication circuits 414A-414H for wireless data transfers between the microcontroller 102B and the modules 404A-404H such replacement is facilitated while supporting monitoring, adjustment, status update, parameter transfer, and/or other operations related to the battery cells 402A-402H. The use of data integrity operations with the WBMS 400 ensures a target level of safety for battery management system operations while taking advantage of the benefits of wireless connectivity for the data transfers between the microcontroller 1023 and the modules 404A-404H. Example data integrity operations include: data hashing; hash verification; preparing packets with data and a related hash; and/or verifying the related hash in a packet before forwarding the packet data to a controller or monitor circuit.

Figure 5:
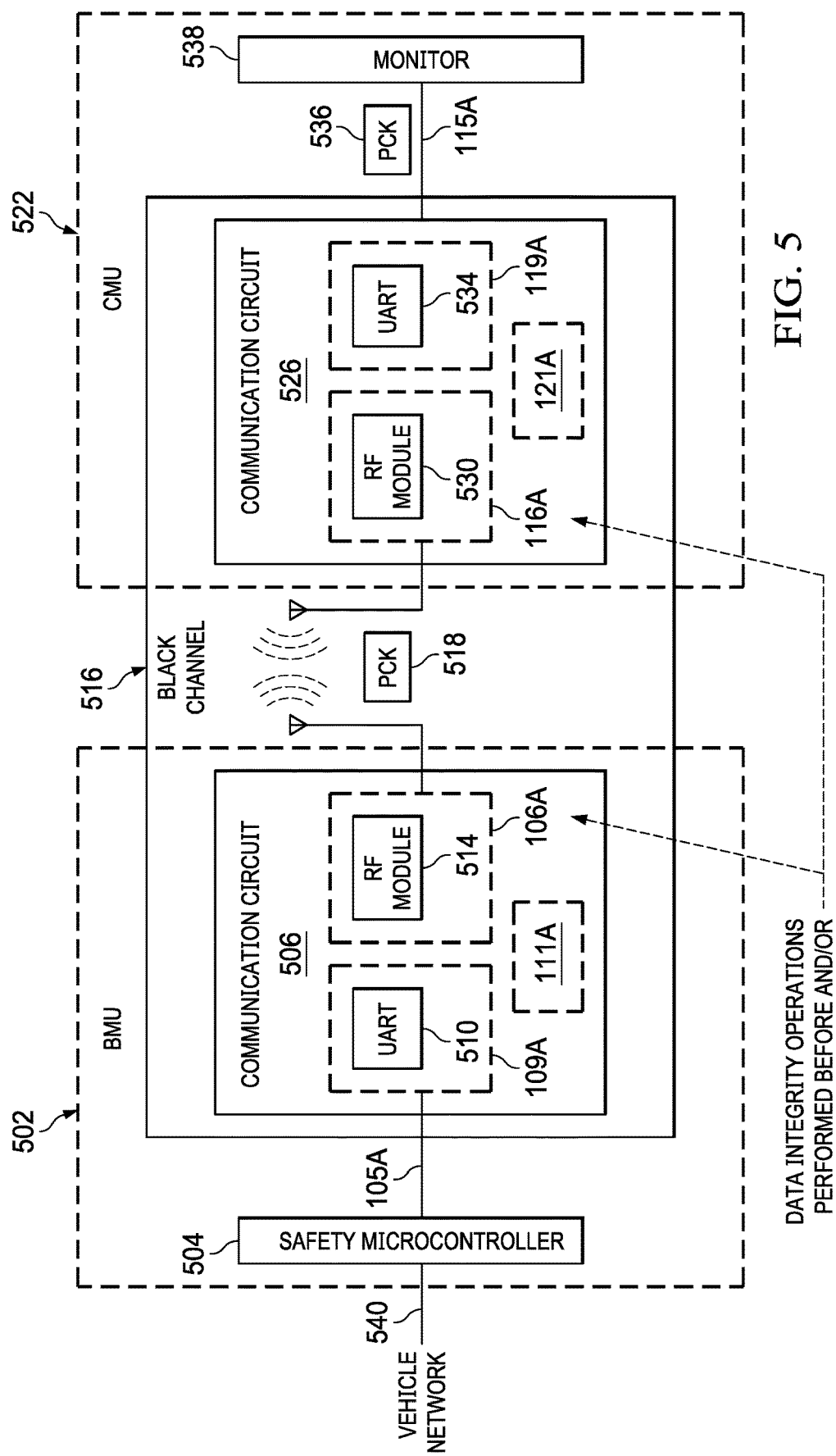
FIG. 5 is a block diagram of a battery management unit (BMU) and a cell monitoring unit (CMU) in accordance with an example embodiment.

FIG. 5 is a block diagram of a BMU 502 and a CMU 522 in accordance with an example embodiment. In some example embodiments, the BMU 502 and the MCU 522 are part of a BMS, specifically a WBMS, for a system (e.g., the system 100 in FIG. 1, the system 200 in FIG. 2, or the WBMS 400 in FIG. 4). The MCU 502 may include, for example, a PCB or other unit with a safety microcontroller 504 (an example of the controller 102 in FIG. 1, the microcontroller 102A in FIG. 2, of the microcontroller 102B in FIG. 4) and a communication circuit 506 (e.g., the primary communication circuit 104 in FIG. 1, the primary communication circuit 104A in FIG. 2, or the primary communication circuit 104B in FIG. 4) coupled to each other via a wired coupling 105A (an example of the wired coupling 105 in FIG. 1). The microcontroller 504 is also coupled to a vehicle network via communication interface 540 (an example of the communication interface 130 in FIG. 1, the communication interface 130A in FIG. 2, or the communication interface 130B in FIG. 4).

In the example of FIG. 5, the communication circuit 506 includes a wired transceiver 109A (an example of the wired transceiver 109 in FIG. 1) and a wireless transceiver 106A (an example of the wireless transceiver 106 in FIG. 1). In some example embodiments, the wired transceiver 109A includes a UART 510. Also, the wireless transceiver 106A includes an RF module 514. The wireless transceiver 106A may also include the components described for the wireless transceiver 106 in FIG. 1. In some example embodiments, the communication circuit 506 is configured to perform the operations of the primary communication circuit 104 in FIG. 1, the primary communication circuit 104A in FIG. 2, or the primary communication circuit 104B in FIG. 4.

The CMU 522 may include, for example, a PCB or other unit with a monitor circuit 538 (an example of the monitor circuit 122 in FIG. 1, or one of the monitor circuits 122A-122N in FIG. 2) and a communication circuit 526 (e.g., the secondary communication circuit 114 in FIG. 1, one of the secondary communication circuits 114A-114N in FIG. 2, or one of the secondary communication circuits 114A-114H in FIG. 4) coupled to each other via a wired coupling 115A (an example of the wired coupling 115 in FIG. 5).

In the example of FIG. 5, the communication circuit 526 includes a wired transceiver 119A (an example of the wired transceiver 119 in FIG. 1) and a wireless transceiver 116A (an example of the wireless transceiver 116 in FIG. 1). In some example embodiments, the wired transceiver 119A includes a UART 534. Also, the wireless transceiver 116A includes an RF module 530. The wireless transceiver 116A may also include the components described for the wireless transceiver 116 in FIG. 1. In some example embodiments, the communication circuit 526 is configured to perform the operations of the secondary communication circuit 114 in FIG. 1, one of the secondary communication circuits 114A-114N in FIG. 2, or one of the secondary communication circuit 114A-114H in FIG. 4.

In the example of FIG. 5, the wireless connection between the communication circuits 506 and 526 is referred to as a black channel 516 because the wireless connection does not comply with data integrity protocols of the safety microcontroller 504 and the monitor circuit 538. In order to provide data integrity for communications between the safety microcontroller 504 and the monitor circuit 538, the communication circuit 506 includes data integrity circuitry 111A (an example of the data integrity circuitry 111 in FIG. 1) and the communication circuit 526 includes data integrity circuitry 121A (e.g., an example of the data integrity circuitry 121 in FIG. 1). Without limitation, example data integrity operations performed by the data integrity circuitry 111A and/or the data integrity circuitry 121 include: data hashing; hash verification; preparing packets (e.g., packet 518) with data and a related hash; and/or verifying the related hash in a packet before forwarding the packet data (e.g., using packet 536) to a controller or monitor circuit. Other data integrity options include: computing a cycle redundancy check (CRC); appending a CRC to a packet before sending the packet; and creating a packet copy and comparing the original packet and the packet copy. In some example embodiments, with the packet copy option, no hash is sent with the transmitted packet. As another option, a packet copy is transmitted.

Figure 6:
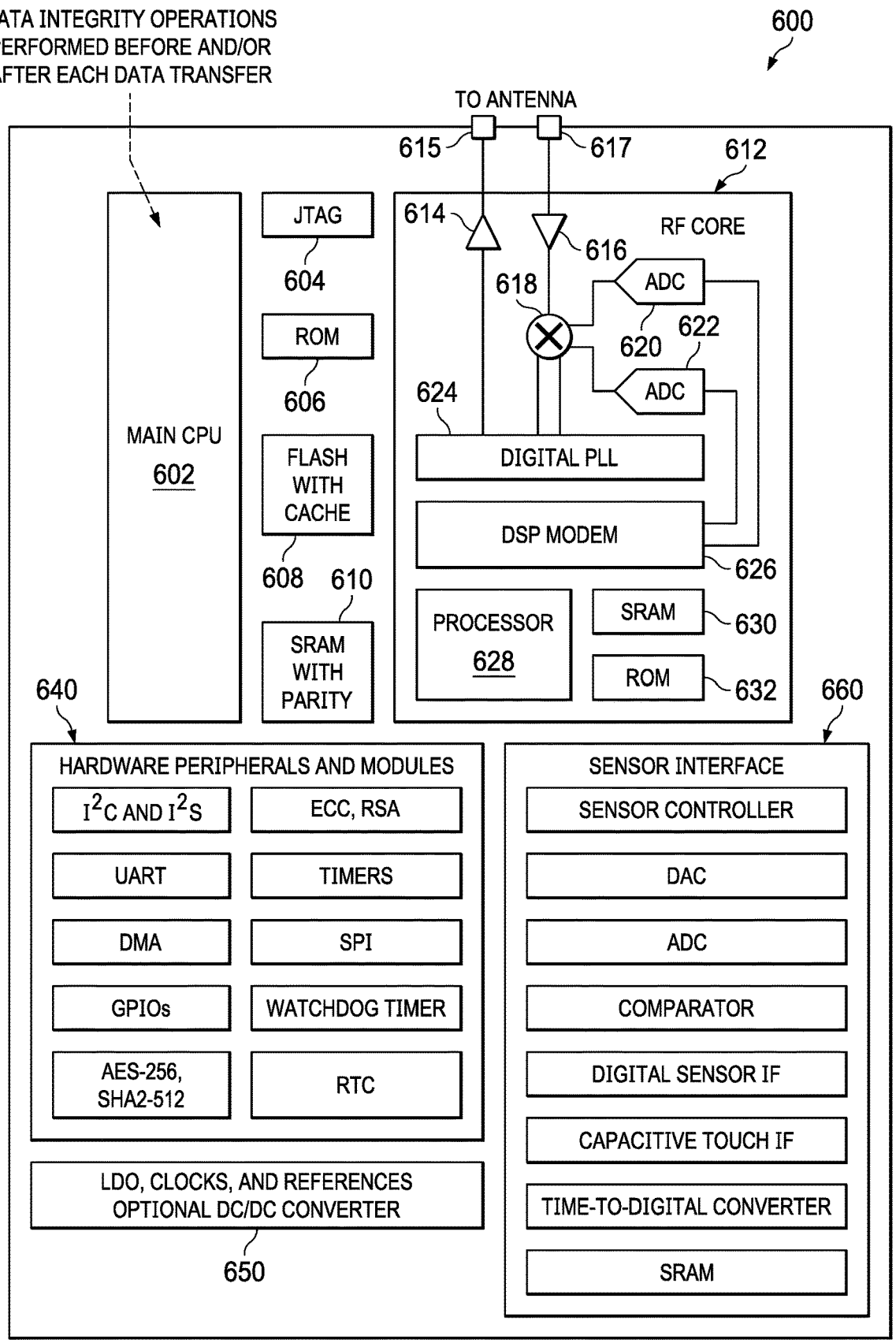
FIG. 6 is a diagram of a communication circuit in accordance with an example embodiment.

FIG. 6 is a diagram of a communication circuit 600 (an example of the primary communication circuit 104 in FIG. 1, the primary communication circuit 104A in FIG. 2, the primary communication circuit 104B in FIG. 4, the communication circuit 506 in FIG. 5, the secondary communication circuit 114 in FIG. 1, one of the secondary communication circuits 114A-114N in FIG. 2, one of the secondary communication circuits 114A-114H in FIG. 4, or the communication circuit 526 in FIG. 5) in accordance with an example embodiment. As shown, the communication circuit 600 includes a main central processing unit (CPU) 602, a Joint Test Action Group (JTAG) interface 604, read-only memory (ROM) 606, Flash memory 608, and static random-access memory (SRAM) 610.

The communication circuit 600 also includes a radio frequency (RF) core 612 (an example of the wireless transceiver 106, the wireless transceiver 116 in FIG. 1, the RF module 514 in FIG. 5, or the RF module 530 in FIG. 5). In the example of FIG. 6, the RF core 612 includes a transit chain 614 and a receive chain 616 coupled to antenna terminals 615 and 617. The receive chain 616 is coupled to a sampler 618, which outputs samples of received data to analog-to-digital converters (ADCs) 620 and 622. The digitized samples are provided to a digital signal processor (DSP) modem 626. As shown, the transmit chain 614 and the sampler 618 are also coupled to a digital phase-locked loop (PLL) 624 to manage timing of receive operations and/or transmit operations. Other example components of the RF core 612 include a processor 628, SRAM 630, and ROM 632.

As shown, the communication circuit 600 also includes hardware peripherals and modules 640. Without limitation, examples of the hardware peripherals and modules 640 include: serial communications interfaces (e.g., $I^2C$, $I^2S$, SPI, etc.); one or more UARTs, a direct memory access (DMA) interface; general programmable input/outputs (GPIOs); an encryption module (e.g., AES-256); a hashing module (e.g., SHA2-512); timers; an error correction code (ECC) module; a cryptosystem module (e.g., RSA); a watchdog timer; and a real-time clock (RTC) module.

In the example of FIG. 6, the communication circuit 600 further includes circuitry 650 such as a low-dropout regulator (LDO), clocks, references, and a direct-current to direct-current (DC/DC) converter. In some example embodiments, the communication circuit 600 also includes a sensor interface 660 with various components to support sensor operations. Without limitation, example components of the sensor interface 660 include: a sensor controller; a digital-to-analog converter (DAC), an ADC, a comparator, a digital sensor interface (IF), a capacitive touch IF, a time-to-digital converter, and SRAM.

With the communication circuit 600, a wired transceiver (e.g., the UART or SPI modules of the hardware peripherals and modules 640) and a wireless transceiver (e.g., the RF core 612) are configured to perform data transfers as described herein. Also, the main CPU 602 and/or other processors (e.g., the processor 628) are configured to perform data integrity operations such as: data hashing; hash verification; preparing packets with data and a related hash; and/or verifying the related hash in a packet before forwarding the packet data to a controller or monitor circuit. The data integrity operations may involve a hashing module (e.g., part of the hardware peripherals and modules 640 in FIG. 6) and/or related instructions, memory, a processor, and/or other components of the communication circuit 600.

In some example embodiments, a communication circuit such as the communication circuit 600 is configured to: generate a hash for data received via the wired transceiver; and verify the hash before the wireless transceiver conveys related data to the antenna. In some example embodiments, the communication circuit is configured to verify the hash by: storing the hash; generating a new hash before the data transfer circuitry performs a data transfer of the data; and comparing the new hash with the stored hash. A system with a communication circuit such as the communication circuit 600 may be an electric vehicle, and the communication circuit is an IC. Further, the controller and modular subsystem may be components of a battery management system for the electric vehicle.

In some example embodiments, the communication circuit is configured to: generate a compare pass signal responsive to the new hash and the stored hash being equal; and perform a data transfer of the data related to the stored hash and the new hash in response to the compare pass signal. In some example embodiments, the communication circuit is configured to: generate a compare fail signal responsive to the new hash and the stored hash not being equal; and prevent data transfer of data related to the stored hash and the new hash in response to the compare fault signal. In some example embodiments, the communication circuit is configured to: prepare a packet that includes the data and the verified hash; and transfer the packet using the wireless transceiver. In some example embodiments, the wireless transceiver of the communication circuit is configured to receive a packet that includes packet data and a related hash, and the communication circuit is configured to: store the related hash; generate a new hash based on the packet data; compare the related hash and the new hash; and forward the packet data to the wired transceiver if the related hash and the new hash match.

Figure 7:
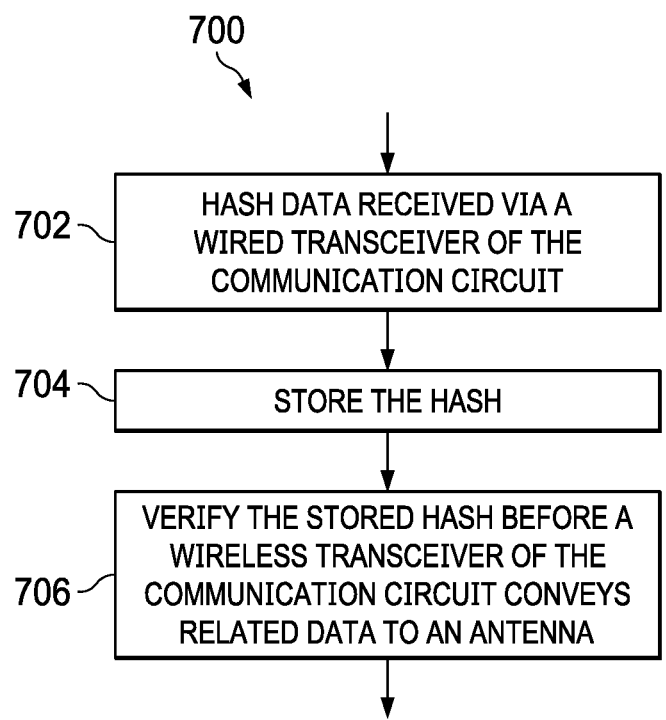
FIG. 7 is a flowchart of a communication circuit method in accordance with an example embodiment.

FIG. 7 is a flowchart of a communication circuit method 700 in accordance with an example embodiment. The method 700 is performed, for example, by a communication circuit (e.g., the primary communication circuit 104 in FIG. 1, the primary communication circuit 104A in FIG. 2, the primary communication circuit 104B in FIG. 4, the communication circuit 506 in FIG. 5, the secondary communication circuit 114 in FIG. 1, one of the secondary communication circuits 114A-114N in FIG. 2, one of the secondary communication circuits 114A-114H in FIG. 4, or the communication circuit 526 in FIG. 5) between a controller and a subsystem (see e.g., FIG. 1). As shown, the method 700 includes receiving data via a wired transceiver of the communication circuit at block 702. At block 704, a hash is generated based on the received data. At block 706, the hash is verified before a wireless transceiver of the communication circuit conveys related data to an antenna.

In some example embodiments, receiving data via the wired transceiver at block 702 includes receiving battery management system data from the controller. As another option, receiving data via the wired transceiver at block 702 includes receiving battery monitor data from the subsystem. In some example embodiments, the method also includes: receiving a packet by the wireless transceiver, the packet having packet data and a hash related to the packet data; and verifying the hash related to the packet data before forwarding the packet data to the wired transceiver.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construc-tion and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or IC package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Modifications are possible in the described embodiments, and other embodiments are possible, within the scope of the claims.

What is claimed is:

1. A communication circuit for communications between a controller and a subsystem with a monitored electrical component, the communication circuit comprising:
   network formation circuitry configured to establish a wireless network between a primary wireless node in communication with the controller and a secondary wireless node in communication with the subsystem;
   data transfer circuitry configured to perform data transfers between the primary wireless node and the secondary wireless node; and
   data integrity circuitry configured to:
      generate a hash based on data received by the communication circuit; and
      verify the hash before the data transfer circuitry performs a data transfer of the data between the primary wireless node and the secondary wireless node.

2. The communication circuit of claim 1, wherein the network formation circuitry and the data transfer circuitry are part of a wireless transceiver adapted to be coupled to an antenna, the communication circuit further comprises a wired transceiver adapted to be coupled to the subsystem or the controller and configured to receive the data, and the data integrity circuitry is configured to:
   verify the hash before the wireless transceiver performs a data transfer of the data between the primary wireless node and the secondary wireless node.

3. The communication circuit of claim 2, wherein the wireless transceiver includes a radio-frequency (RF) module.

4. The communication circuit of claim 2, wherein the wired transceiver includes a Universal Asynchronous Receiver-Transmitter (UART).

5. The communication circuit of claim 2, wherein the data transfer circuitry is configured to:
   prepare a packet that includes the data and the hash; and
   use the wireless transceiver to transfer the packet between the primary wireless node and the secondary wireless node.

6. The communication circuit of claim 2, wherein the wireless transceiver is configured to receive a packet that includes packet data and a related hash, and the data integrity circuitry is configured to:
   store the related hash;
   generate a new hash based on the packet data;
   compare the related hash and the new hash; and
   forward the packet data to the wired transceiver if the related hash and the new hash match.

7. The communication circuit of claim 1, wherein the data integrity circuitry is configured to verify the hash by:
   storing the hash;
   generating a new hash before the data transfer circuitry performs a data transfer of the data; and
   comparing the new hash with the stored hash.

8. The communication circuit of claim 1, wherein the communication circuit is an integrated circuit, and the controller and subsystem are components of a battery management system for an electric vehicle.

9. The communication circuit of claim 1, wherein the data integrity circuitry is configured to generate a compare signal responsive to comparing a new hash with the hash, and the data transfer circuitry is configured to transfer the data or prevent data transfer of the data based on the compare signal.

10. A communication circuit for communications between a controller and a subsystem with a monitored electrical component, the communication circuit comprising:
network formation circuitry configured to establish a wireless network between a primary wireless node in communication with the controller and a secondary wireless node in communication with the subsystem;
data transfer circuitry configured to perform data transfers between the primary wireless node and the secondary wireless node; and
data integrity circuitry configured to:
generate a hash for data received by the communication circuit; and
verify the hash before the data transfer circuitry performs a data transfer of the data between the primary wireless node and the secondary wireless node by:
storing the hash,
generating a new hash before the data transfer circuitry performs a data transfer of the data, and
comparing the new hash with the stored hash, wherein the data integrity circuitry is configured to generate a compare pass signal responsive to the new hash and the hash being equal, and the data transfer circuitry is configured to perform a data transfer of the data related to the hash and the new hash in response to the compare pass signal.

11. A communication circuit for communications between a controller and a subsystem with a monitored electrical component, the communication circuit comprising:
network formation circuitry configured to establish a wireless network between a primary wireless node in communication with the controller and a secondary wireless node in communication with the subsystem;
data transfer circuitry configured to perform data transfers between the primary wireless node and the secondary wireless node; and
data integrity circuitry configured to:
generate a hash for data received by the communication circuit; and
verify the hash before the data transfer circuitry performs a data transfer of the data between the primary wireless node and the secondary wireless node by:
storing the hash for the data received by the communication circuit,
generating a new hash before the data transfer circuitry performs a data transfer of the data, and
comparing the new hash with the stored hash, wherein the data integrity circuitry is configured to generate a compare fail signal responsive to the new hash and the hash not being equal, and the data transfer circuitry is configured to prevent data transfer of data related to the hash and the new hash in response to the compare fail signal.

12. A system, comprising:
a communication circuit having:
a wired transceiver adapted to be coupled to a controller or modular subsystem; and
a wireless transceiver adapted to be coupled to an antenna, wherein the communication circuit is configured to:
generate a hash based on data received via the wired transceiver; and
verify the hash before the wireless transceiver conveys the data to the antenna.

13. The system of claim 12, wherein the hash is a first hash, and wherein the communication circuit is configured to verify the hash by:
generating a new hash before the wireless transceiver conveys the data to the antenna; and
comparing the new hash with the first hash.

14. The system of claim 11, wherein the communication circuit is configured to:
prepare a packet that includes the data and the hash; and
transfer the packet using the wireless transceiver.

15. The system of claim 12, wherein the wireless transceiver is configured to receive a packet that includes packet data and a related hash, and the communication circuit is configured to:
store the related hash;
generate a new hash based on the packet data;
compare the related hash and the new hash; and
forward the packet data to the wired transceiver if the related hash and the new hash match.

16. The system of claim 12, wherein the system is an electric vehicle, the communication circuit is an integrated circuit, and the controller and modular subsystem are components of a battery management system for the electric vehicle.

17. A system, comprising:
a communication circuit having:
a wired transceiver adapted to be coupled to a controller or modular subsystem; and
a wireless transceiver adapted to be coupled to an antenna, wherein the communication circuit is configured to:
generate a first hash for data received via the wired transceiver; and
verify the first hash before the wireless transceiver conveys the data to the antenna by:
generating a new hash before the wireless transceiver conveys the data to the antenna; and
comparing the new hash with the first hash, wherein the communication circuit is configured to:
generate a compare pass signal responsive to the new hash and the first hash being equal; and
perform a data transfer of the data related to the first hash and the new hash in response to the compare pass signal.

18. The system of claim 13, A system, comprising:
a communication circuit having:
a wired transceiver adapted to be coupled to a controller or modular subsystem; and
a wireless transceiver adapted to be coupled to an antenna, wherein the communication circuit is configured to:
generate a first hash for data received via the wired transceiver; and
verify the first hash before the wireless transceiver conveys the data to the antenna by:
generating a new hash before the wireless transceiver conveys the data to the antenna; and
comparing the new hash with the first hash, wherein the communication circuit is configured to:
generate a compare fail signal responsive to the new hash and the first hash not being equal; and prevent data transfer of data related to the first hash and the new hash in response to the compare fail signal.

19. A method performed by a communication circuit between a controller and a subsystem, the method comprising:
receiving data via a wired transceiver of the communication circuit;
generating a hash based on the received data; and
verifying the hash before a wireless transceiver of the communication circuit conveys the received data to an antenna.

20. The method of claim 19, wherein receiving data via the wired transceiver comprises receiving battery management system data from the controller.

21. The method of claim 19, wherein receiving data via the wired transceiver comprises receiving battery monitor data from the subsystem.

22. The method of claim 19, further comprising:
receiving a packet by the wireless transceiver, the packet having packet data and a hash related to the packet data; and
verifying the hash related to the packet data before forwarding the packet data to the wired transceiver.

23. The method of claim 19, further comprising:
storing the hash;
generating a new hash;
comparing the hash with the new hash to generate a compare signal; and
determining whether to transfer the received data or prevent the transfer of the received data to the antenna based on the compare signal.

24. The method of claim 23, wherein, in response to the compare signal being indicative of the hash and the new has being equal, transferring the received data to the antenna, and in response to the compare signal being indicative of the hash and the new hash not being equal, preventing the transfer of the received data to the antenna.

* * * * *